United States Patent
Funada (10) Patent No.: US 9,614,408 B2
(45) Date of Patent: Apr. 4, 2017

(54) ELECTRIC LINEAR ACTUATOR

(71) Applicant: NTN Corporation, Osaka-shi (JP)

(72) Inventor: Kensuke Funada, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 14/801,935

(22) Filed: Jul. 17, 2015

(65) Prior Publication Data

US 2015/0326088 A1 Nov. 12, 2015

Related U.S. Application Data

(63) Continuation of application No. PCT/JP2014/050848, filed on Jan. 17, 2014.

(30) Foreign Application Priority Data

Jan. 18, 2013 (JP) .................. 2013-007092

(51) Int. Cl.
| | | |
|---|---|---|
| *F16H 57/02* | (2012.01) | |
| *H02K 5/06* | (2006.01) | |
| *H02K 7/116* | (2006.01) | |
| *F16H 57/03* | (2012.01) | |
| *H02K 7/06* | (2006.01) | |

(Continued)

(52) U.S. Cl.
CPC ........... *H02K 5/06* (2013.01); *F16H 25/2204* (2013.01); *F16H 57/03* (2013.01); *H02K 7/06* (2013.01); *H02K 7/116* (2013.01); *F16H 2025/204* (2013.01); *F16H 2025/2031* (2013.01); *F16H 2025/2081* (2013.01)

(58) Field of Classification Search
CPC .............. H02K 5/06; F16H 2025/2031; F16H 2025/2081; F16H 57/03
See application file for complete search history.

(56) References Cited

U.S. PATENT DOCUMENTS

| | | | |
|---|---|---|---|
| 2,403,092 A | 7/1946 | Lear | |
| 4,506,561 A * | 3/1985 | Hayakawa | ............ F16H 57/025 220/643 |

(Continued)

FOREIGN PATENT DOCUMENTS

| | | |
|---|---|---|
| JP | 05-71615 | 3/1993 |
| JP | 05-141506 | 6/1993 |

(Continued)

*Primary Examiner* — Dang Le
(74) *Attorney, Agent, or Firm* — Harness, Dickey & Pierce, P.L.C.

(57) ABSTRACT

An electric linear actuator has a housing, an electric motor, a speed reduction mechanism, and a ball screw mechanism. The ball screw mechanism has a nut and a screw shaft. Both include a helical screw groove. The nut is supported by rolling bearings mounted on the housing. The screw shaft is coaxially integrated with the drive shaft. The screw shaft is inserted into the nut, via a large number of balls. The housing has a first housing and a second housing. The electric motor is mounted on the first housing. The second housing abuts against an end face of the first housing. At least one of the first and second housings is formed with ribs. The ribs extend from each of securing portions to a containing portion that contains the screw shaft. The securing portions are arranged on the periphery of the housing to receive fastening bolts.

5 Claims, 6 Drawing Sheets

(51) Int. Cl.
*F16H 25/22* (2006.01)
*F16H 25/20* (2006.01)

(56) References Cited

U.S. PATENT DOCUMENTS

| | | | |
|---|---|---|---|
| 5,309,789 A | | 5/1994 | Kameda et al. |
| 5,325,739 A | | 7/1994 | Toyota et al. |
| 6,014,915 A | * | 1/2000 | Evans .................. F16H 1/16 |
| | | | 74/606 R |
| 7,605,506 B2 | * | 10/2009 | Kanda .................. H02K 5/148 |
| | | | 310/51 |
| 2010/0319477 A1 | | 12/2010 | Tateishi et al. |
| 2012/0247240 A1 | | 10/2012 | Kawahara et al. |
| 2015/0326088 A1 | * | 11/2015 | Funada .................. H02K 7/06 |
| | | | 310/83 |
| 2016/0076631 A1 | * | 3/2016 | Funada .................. F16J 15/14 |
| | | | 74/89.4 |

FOREIGN PATENT DOCUMENTS

| | | |
|---|---|---|
| JP | 09-089086 | 3/1997 |
| JP | 09-303514 | 11/1997 |
| JP | 2000-018361 | 1/2000 |
| JP | 2005-329912 | 12/2005 |
| JP | 2009-156416 | 7/2009 |
| JP | 2009-216118 | 9/2009 |
| JP | 2010-007699 | 1/2010 |
| JP | 2011-117513 | 6/2011 |
| JP | 2012-112442 | 6/2012 |
| JP | 2012-125044 | 6/2012 |

\* cited by examiner

PRIOR ART

ELECTRIC LINEAR ACTUATOR

CROSS-REFERENCE TO RELATED APPLICATIONS

This application is a continuation of International Application No. PCT/JP2014/050848, filed Jan. 17, 2014, which claims priority to Japanese Application No. 2013-007092, filed Jan. 18, 2013. The disclosures of the above applications are incorporating herein by reference.

FIELD

The present disclosure relates to an electric actuator, with a ball screw mechanism, used in motors in general industries and driving sections of automobiles etc. and, more particularly, to an electric linear actuator used in a transmission or a parking brake of an automobile to convert rotary motion from an electric motor to linear motion of a driving shaft, via a ball screw mechanism.

BACKGROUND

Generally, gear mechanisms, such as a trapezoidal thread worm gear mechanism or a rack and pinion gear mechanism, are used as a mechanism to convert rotary motion of an electric motor to axial linear motion in an electric linear actuator used in various kinds of driving sections. These motion converting mechanisms involve sliding contact portions. Thus, power loss is increased and, accordingly, size of the electric motor and power consumption are increased. Thus, ball screw mechanisms have been widely used as more efficient actuators.

In prior art electric linear actuator, an output member can be axially displaced by rotating a nut forming a ball screw by an electric motor supported on a housing of the actuator. A ball screw shaft, inserted into the nut, is axially driven. As usual, the friction of the ball screw mechanism is very low. The nut can be easily rotated by a thrust load applied to the output-side member. Thus, it is necessary to hold the position of the output member when the electric motor is stopped.

Figure 6:
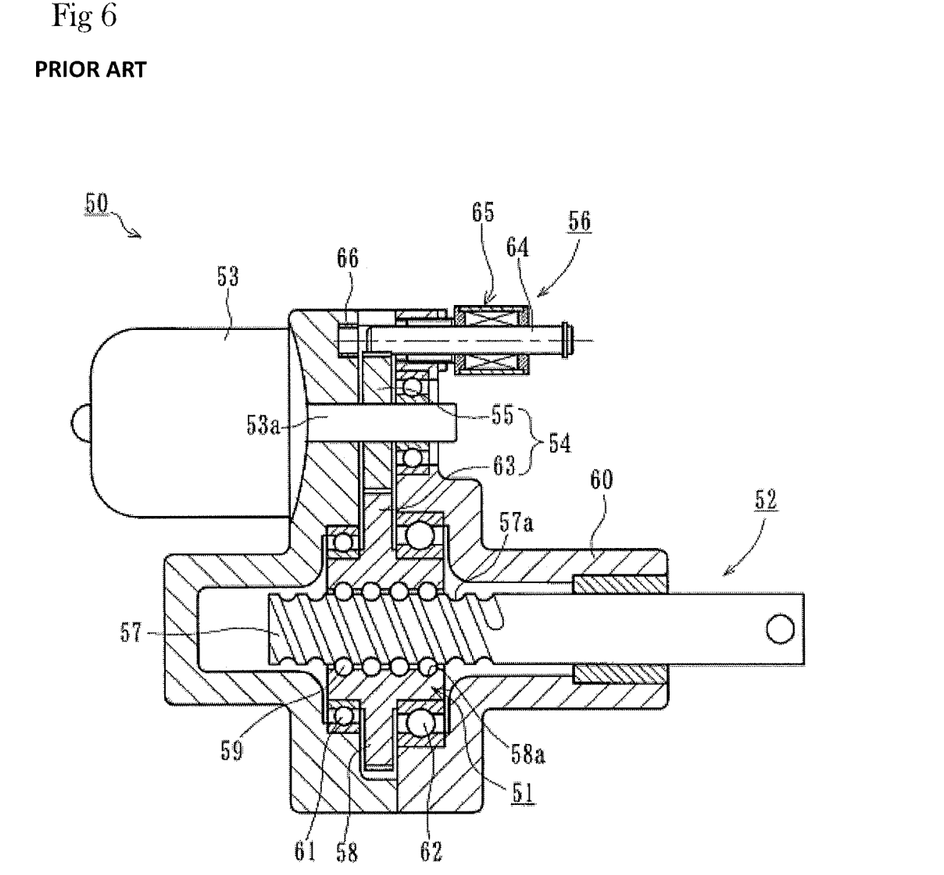
FIG. 6 is a longitudinal section view of a prior art electric linear actuator.

Accordingly, an electric linear actuator has been developed where a brake means for the electric motor or a low efficient means such as a worm gear is provided as the power transmitting means. One representative example of the electric linear actuator is shown in FIG. 6. This electric linear actuator 50 has an actuator main body 52 with a ball screw 51 to convert rotational motion to linear motion. A gear reduction mechanism 54 transmits the rotational motion of the motor 53 to the actuator main body 52. A position holding mechanism 56 holds the position of the actuator main body 52, while engaging a first gear 55 to form the gear reduction mechanism 54.

The ball screw 51 has a screw shaft 57 as an output shaft. The screw shaft 57 is formed on its outer circumference with a helical screw groove 57a. A nut 58, formed on its inner circumference with a helical screw groove 58a, is adapted to be inserted onto the screw shaft 57. A large number of balls 59 are rollably contained in a rolling passage formed between the screw grooves 57a, 58a, arranged opposite to each other.

In the actuator main body 52, the nut 58 is rotationally supported by a pair of ball bearings 61 and 62. The screw shaft 57 is axially movably supported but is non-rotational relative to the housing 60. The screw shaft 57 can be linearly moved when the nut 58 is rotated via the gear reduction mechanism 54.

The gear reduction mechanism 54 has a first gear 55, formed as a smaller spur gear secured on a motor shaft 53a of the electric motor 53. A second gear 63, formed as a larger spur gear, is integrally formed on the outer circumference of the nut 58.

The position holding mechanism 56, with a shaft 64, acts as a lock member. The shaft 64 is able to engage the first gear 55. A solenoid 65, acting as a driving means for driving the shaft 64, engages and disengages the shaft 64 with the first gear 55. The shaft 64 is made as a bar member and is linearly driven by the solenoid 65. The tip end of the shaft 64 is adapted to engage a receiving part 66. By actuating the solenoid 65, rotation of the first gear 55 can be firmly stopped by the shaft 64 engaging the first gear 55. Thus, it is possible to stably hold the position of the screw shaft 57 in the actuator main body 52 without any slippage therebetween. See, JP2009-156416 A.

In the prior art electric linear actuator 50, the gear reduction mechanism 54 and the ball screw 51 are contained within a two-piece type housing 60. The rotational power of the electric motor 53, mounted outside the housing 60, is transmitted to the ball screw 51, via the gear reduction mechanism 54. The nut 58 converts the rotational power of the electric motor 53 to the linear motion of the screw shaft 57.

In this kind of automobile, electric linear actuator 50, driving parts, such as the ball screw 51, are contained within the housing 60 to prevent entry of muddy water or oil and the scattering of grease contained in the housing 60. Accordingly, the housing 60 should withstand a load received from the driving parts.

For example, the housing is required not only to have sufficient strength, not to be damaged when the screw shaft 57 collides with the bottom of the housing 60, but also to have desirable strength and durability not to cause deformation of fitting surfaces of the housing 60 and adverse influence to sealability.

SUMMARY

It is, therefore, an object of the present disclosure to provide an electric linear actuator that reduces weight of the housing and improves durability of the housing while increasing the strength against loads applied to the housing.

An electric linear actuator comprises a housing, an electric motor mounted on the housing, a speed reduction mechanism and a ball screw mechanism. The speed reduction mechanism reduces rotational speed of the electric motor, via a motor shaft. The ball screw mechanism converts rotational motion of the electric motor, transmitted via the speed reduction mechanism, to axial linear motion of a drive shaft. The ball screw mechanism comprises a nut and a screw shaft. The nut has a helical screw groove on its inner circumference. The nut is supported by rolling bearings mounted on the housing. The nut is rotationally but axially immovably mounted in the housing. The screw shaft is coaxially integrated with the drive shaft. The screw shaft has a helical screw groove on its outer circumference corresponding to the helical screw groove of the nut. The screw shaft is inserted into the nut via a large number of balls. The screw shaft is supported axially movably but not rotationally. The housing comprises a first housing and a second housing. The electric motor is mounted on the first housing. The second housing abuts against an end face of the first housing. At least one of the first and second housings is formed with ribs. The ribs extend from each of the securing portions to a containing portion that contains the screw shaft. The securing portions are arranged about the periphery of the housing to receive the fastening bolts.

The speed reduction mechanism reduces rotational speed of the electric motor, via a motor shaft. The ball screw mechanism converts rotational motion of the electric motor, transmitted via the speed reduction mechanism, to axial linear motion of the drive shaft. The ball screw mechanism comprises a nut and screw shaft. The nut has a helical screw groove on its inner circumference. The nut is supported by rolling bearings. The nut is rotationally but axially immovably mounted on the housing. The screw shaft is coaxially integrated with the drive shaft. The screw shaft has a helical screw groove on its outer circumference corresponding to the helical screw groove of the nut. The screw shaft is inserted into the nut via a large number of balls. The screw shaft is axially movably but not rotationally supported in the housing. The housing comprises a first housing and a second housing. The electric motor is mounted on the first housing. The second housing abuts against an end face of the first housing. At least one of the first and second housings is formed with ribs. The ribs extend from each of the securing portions to a containing portion that contains the screw shaft. Fastening bolts pass through the securing portions arranged about the periphery of the housing. Thus, it is possible to provide an electric linear actuator that can improve the strength and rigidity of the housing while reducing weight of the housing. Thus, this improves the durability of the housing and also prevents deformation of fitting surfaces of the housing to improve sealability.

The housing is formed from a die-cast aluminum alloy. This makes it possible to improve the mass productivity, reduce manufacturing cost and the amount of aluminum usage while increasing the strength and thus reducing the weight of the housing.

The height of each rib arcuately varies from the securing portion toward the containing portion (cylindrical portion) of the housing. Thus, the tangential inclination of the arcuate rib becomes gradually gentle toward the containing portion (cylindrical portion). According to this structure, the ribs help to support the load applied to the containing portion, which is the weakest portion. Thus, it is possible to optimize the design of the weakest portion (containing portion) and thus improve the durability of the electric linear actuator while increasing the strength against the load applied to the weakest portion.

The radially outermost end of each rib is set at a position radially outer than the bolt pitch circle diameter (B.C.D) of the fastening bolts. This suppresses stress concentration that would be caused by a bending moment applied to the housing. Thus, this further improves the durability while increasing the strength and rigidity of the housing.

Each rib comprises a plurality of thin walled ribs. This prevents the generation of air bubbles in a molded body during the die casting process. Also, it reduces the weight of the housing without reducing the strength of the housing. This achieves smooth circulation of mold lubricant during molding. Thus, it improves the productivity.

Each rib comprises a pair of ribs. The distance between ribs varies so that it gradually increases toward the containing portion. This further improves the strength and rigidity of the housing.

The drive shaft is formed integrally with the screw shaft. A radially extending engaging pin is mounted on one end of the drive shaft. A guide member, having axially extending guide grooves, is mounted within a blind bore of the housing. The engaging pin engages the guide grooves. Thus, the screw shaft is supported axially movably but not rotationally.

The electric linear actuator of the present disclosure comprises a housing, an electric motor mounted on the housing, a speed reduction mechanism and a ball screw mechanism. The speed reduction mechanism reduces rotational speed of the electric motor, via a motor shaft. The ball screw mechanism converts rotational motion of the electric motor transmitted, via the speed reduction mechanism, to axial linear motion of a drive shaft. The ball screw mechanism comprises a nut and a screw shaft. The nut includes a helical screw groove on its inner circumference. The nut is supported by rolling bearings mounted on the housing. The nut is rotationally but axially immovably mounted in the housing. The screw shaft is coaxially integrated with the drive shaft. The screw shaft includes a helical screw groove on its outer circumference corresponding to the helical screw groove of the nut. The screw shaft is inserted into the nut, via a large number of balls. The screw shaft is supported axially movably but not rotationally in the housing. The housing comprises a first housing and a second housing. The electric motor is mounted on the first housing. The second housing abuts against an end face of the first housing. At least one of the first and second housings is formed with ribs. The ribs extend from each of securing portions, arranged on the periphery of the housing, to a containing portion that contains the screw shaft. Fastening bolts pass through the securing portions. The electric linear actuator improves the strength and rigidity of the housing while reducing weight of the housing. This improves durability of the housing and also prevents deformation of fitting surfaces of the housing to improve sealability.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

An electric linear actuator comprises a housing formed from die-cast aluminum alloy. An electric motor is mounted on the housing. A speed reduction mechanism reduces rotational speed of the electric motor, via a motor shaft. A ball screw mechanism converts rotational motion of the electric motor transmitted, via the speed reduction mechanism, to axial linear motion of a drive shaft. The ball screw mechanism comprises a nut and screw shaft. The nut includes a helical screw groove on its inner circumference. The nut is supported by rolling bearings mounted on the housing. The nut is rotationally but axially immovably mounted in the housing. The screw shaft is coaxially integrated with the drive shaft. The screw shaft includes a helical screw groove on its outer circumference corresponding to the helical screw groove of the nut. The screw shaft is inserted into the nut, via a large number of balls. The screw shaft is axially movably supported but not rotationally supported in the housing. The housing comprises a first housing and a second housing. The electric motor is mounted in the first housing. The second housing abuts against an end face of the first housing. A cylindrical blind bore is formed at the abutting area of the first and second housings to contain the screw shaft. A plurality of partially projected securing portions is formed on one of the housings. Fastening bolts are inserted into the securing portions about the periphery of an abutting surface of the substantially circular housing. At least one of the first and second housings is formed with ribs. The ribs extend from each of securing portions arranged on the periphery of the housing to a containing portion, cylindrical portion, that contains the screw shaft. The height of each rib arcuately varies from the securing portion toward the containing portion (cylindrical portion) of the housing. Thus, the tangential inclination of the arcuate rib becomes gradually gentle toward the containing portion (cylindrical portion).

One preferred embodiment and modifications of the present disclosure will be hereinafter described with reference to the drawings.

Figure 1:
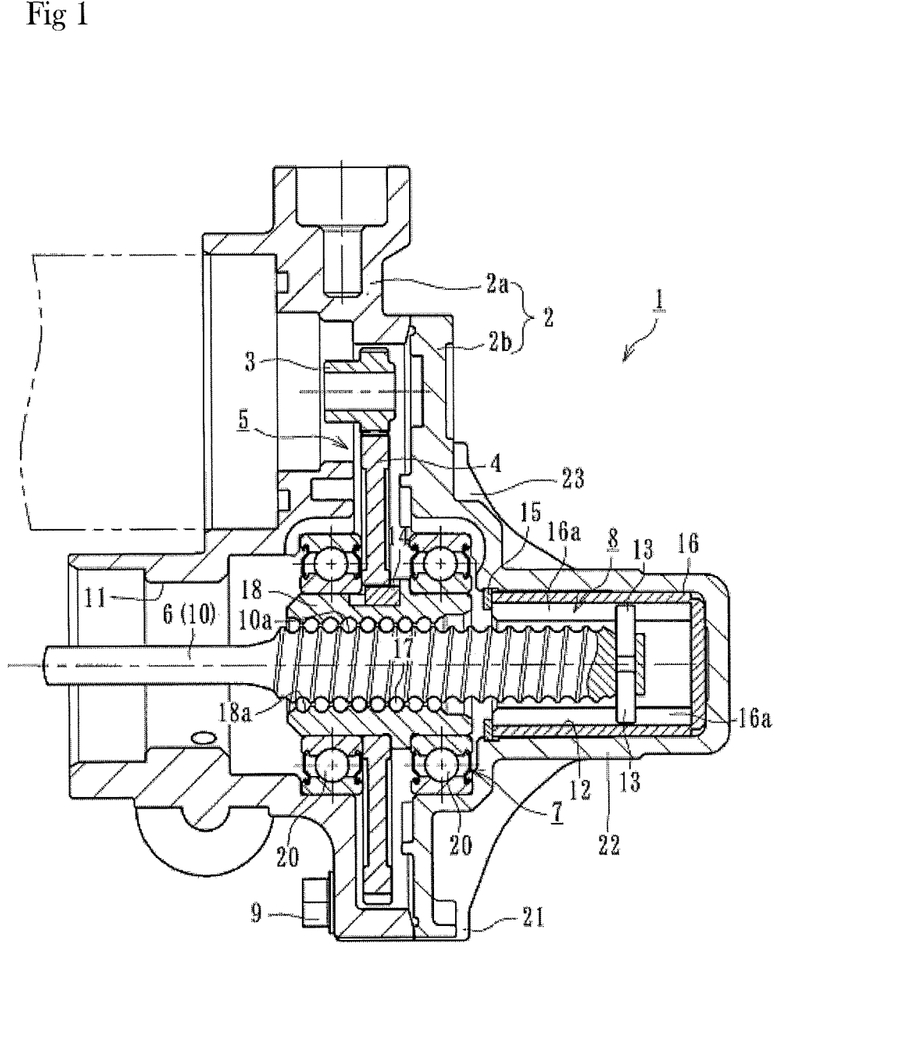
FIG. 1 is a longitudinal section view of one preferable embodiment of an electric linear actuator of the present disclosure.
Figure 2:
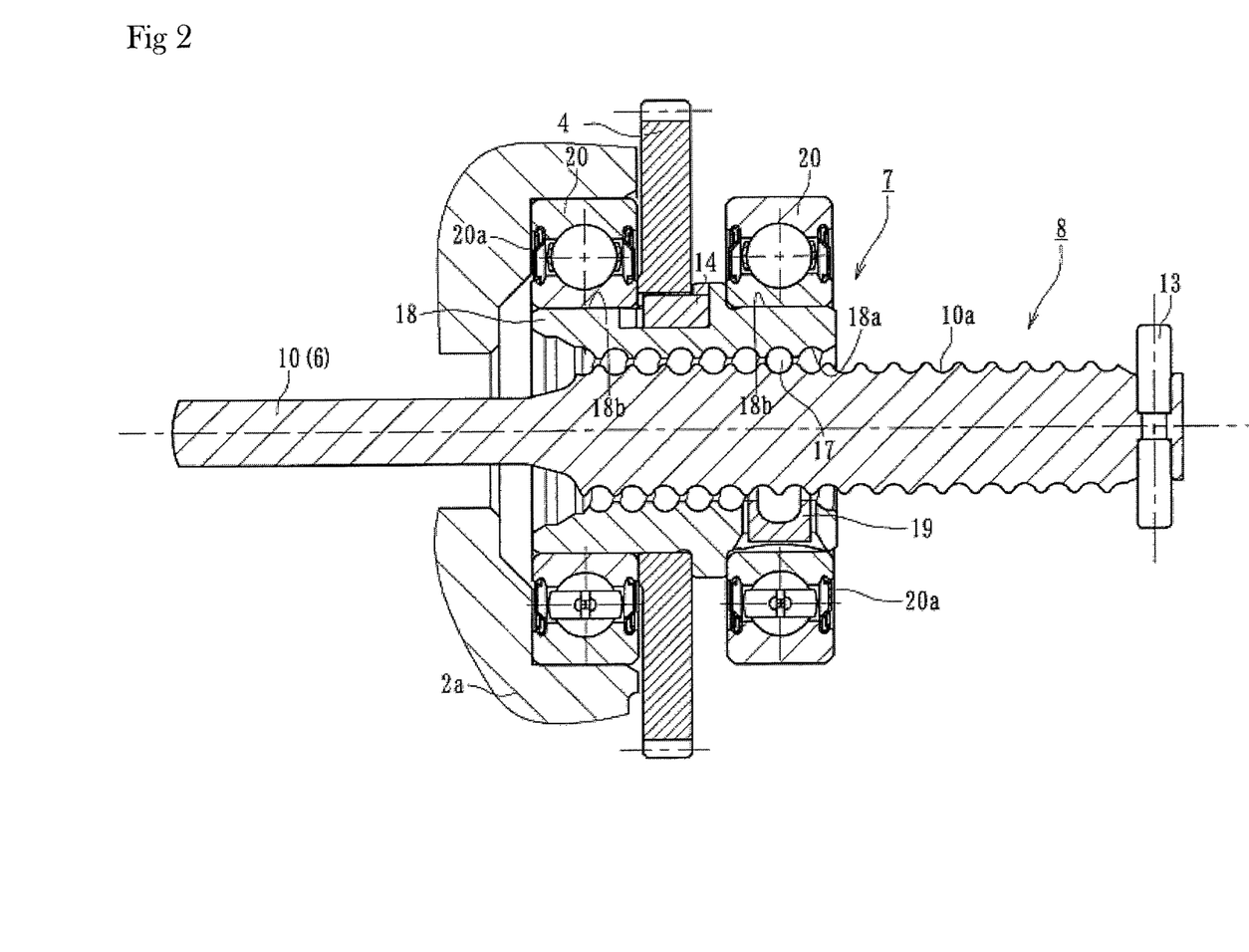
FIG. 2 is a longitudinal section view of an actuator main body of FIG. 1.
Figure 3A:
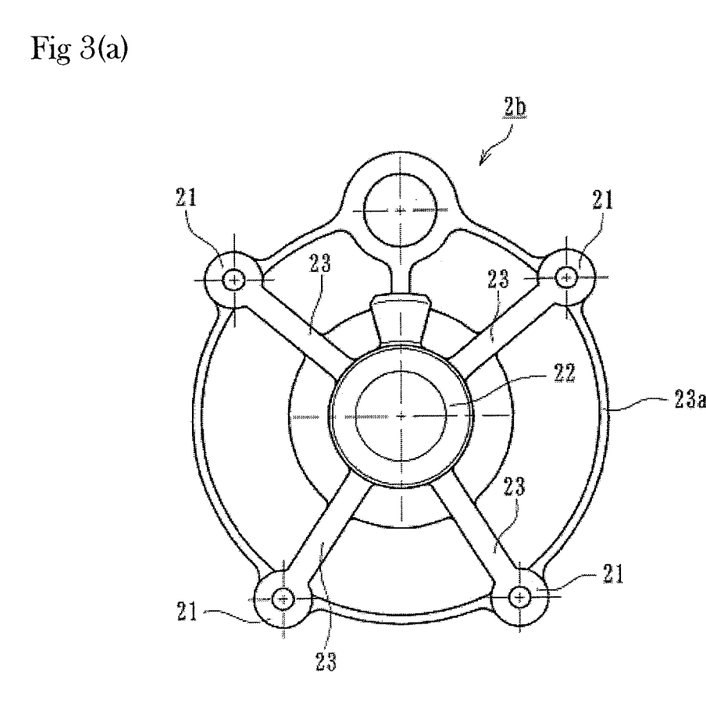
FIG. 3(a) is a front elevation view of a second housing of FIG. 1.
Figure 3B:
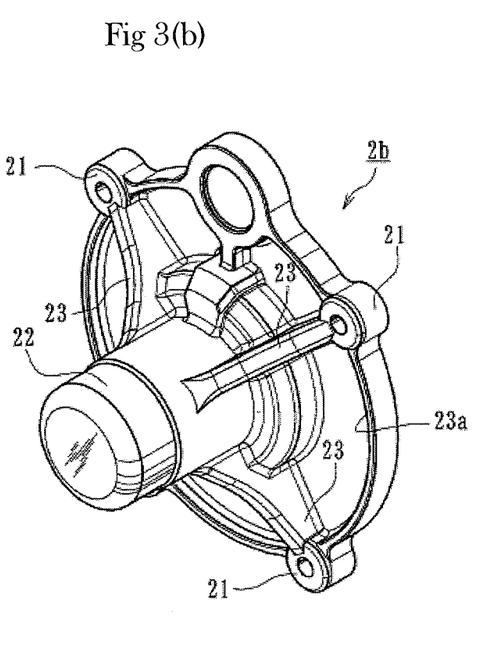
FIG. 3(b) is a perspective view of FIG. 3(a).
Figure 4A:
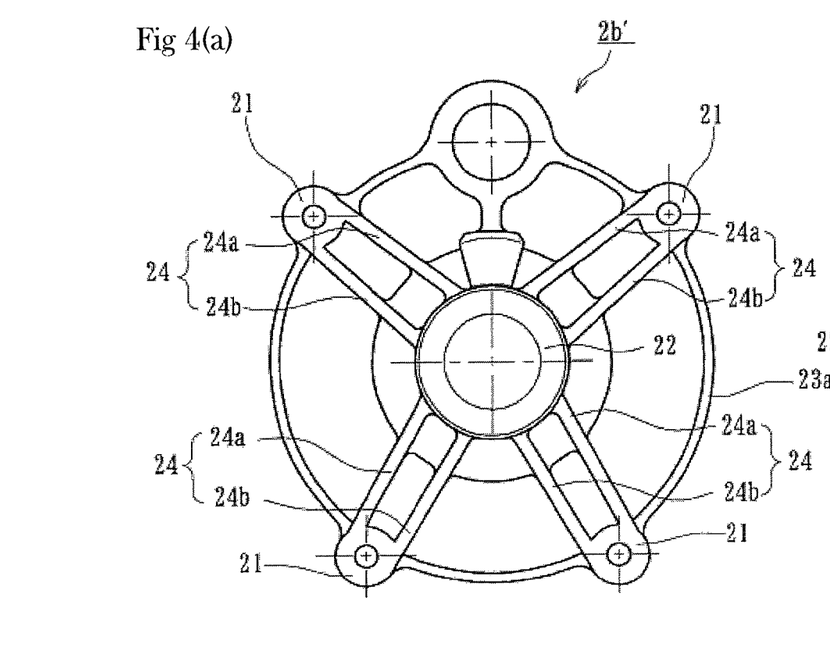
FIG. 4(a) is a front elevation view of a modification of the second housing of FIG. 3.
Figure 4B:
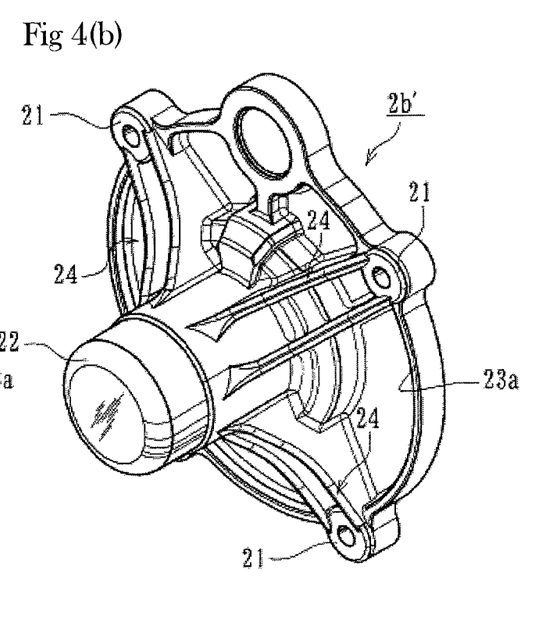
FIG. 4(b) is a perspective view of FIG. 4(a).
Figure 5A:
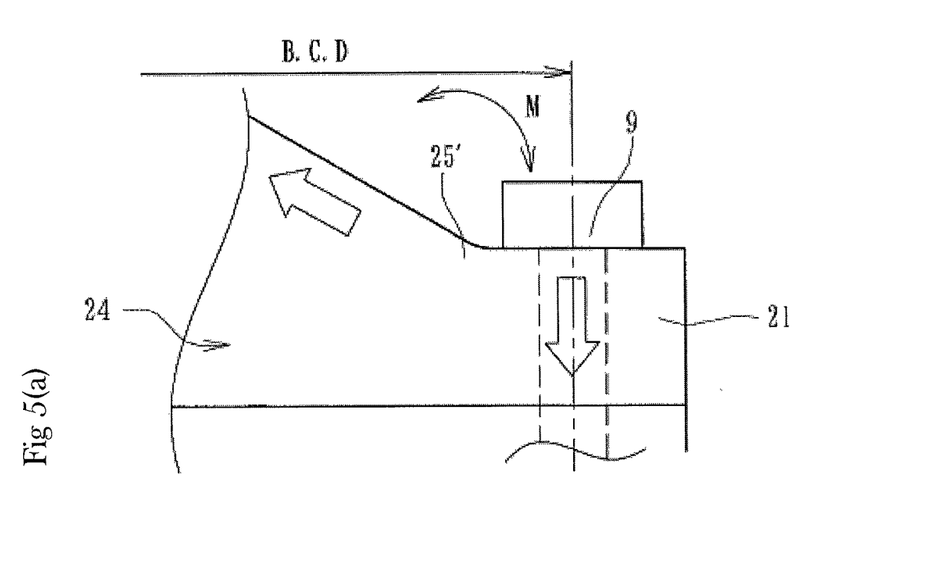
FIG. 5(a) is a partially enlarged view of a tip end of the rib of FIG. 4.
Figure 5B:
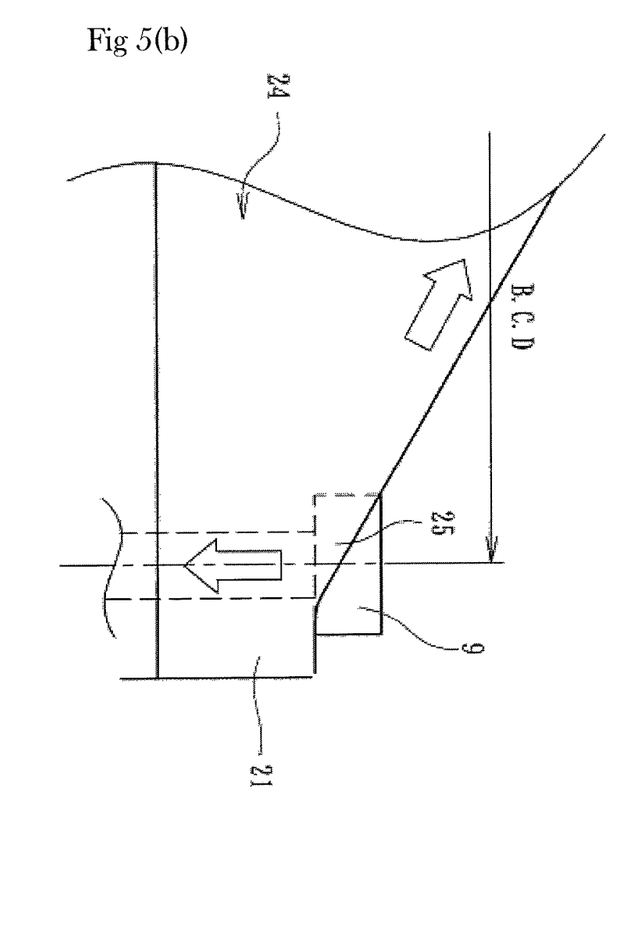
FIG. 5(b) is a partially enlarged view of a comparative example of FIG. 5(a).

FIG. 1 is a longitudinal section view of one preferable embodiment of an electric linear actuator of the present disclosure. FIG. 2 is a longitudinal section view of an actuator main body of FIG. 1. FIG. 3(*a*) is a front elevation view of a second housing of FIG. 1. FIG. 3(*b*) is a perspective view of FIG. 3(*a*). FIG. 4(*a*) is a front elevation view of a modification of the second housing of FIG. 3. FIG. 4(*b*) is a perspective view of FIG. 4(*a*). FIG. 5(*a*) is a partially enlarged view of a tip end of the rib of FIG. 4. FIG. 5(*b*) is a partially enlarged view of a comparative example of FIG. 5(*a*).

As shown in FIG. 1, the electric linear actuator 1 includes a housing 2, an electric motor (not shown) mounted on the housing 2, a speed reduction mechanism 5 and a ball screw mechanism 7. The speed reduction mechanism includes an input gear 3 mounted on a motor shaft (not shown) of the electric motor and an output gear 4 mating with the input gear 3. The ball screw mechanism 7 converts rotational motion of the electric motor to axial linear motion of a drive shaft 6. An actuator main body 8 includes the ball screw mechanism 7.

The housing 2 includes a first housing 2*a* and a second housing 2*b*. The housings 2*a*, 2*b* abut one another and are integrally fastened to each other by fastening bolts 9. The electric motor is mounted on the first housing 2*a*. Blind bores 11, 12, containing a screw shaft 10, are formed in the first and second housings 2*a*, 2*b*, respectively.

The housing 2 is formed by die casting aluminum alloy such as A 6061, ADC 12 etc. The housing 2 is subjected to a so-called precipitation hardening treatment that includes a series of heat treatments such as solution heat treatment, quenching treatment and age hardening treatment. The solution heat treatment forms solid solution by high temperature heating. The quenching treatment rapidly cools the solution heat treated housing. The age-hardening treatment (tempering treatment) for precipitation by holding at the room temperature or heating at a low temperature (100~200° C.) to cause large lattice distortion in the precipitated phase. Such a precipitation hardening treatment improves the mass productivity and reduces the manufacturing cost and weight of the housing 2 while increasing its strength and reducing the amount of aluminum consumption.

The input gear 3 is non-rotationally press-fit onto the end of the motor shaft of the electric motor. The output gear 4 mates with the input gear 3. The output gear 4 is integrally secured on a nut 18, forming part of the ball screw mechanism 7, via a key 14.

The drive shaft 6 is integrally formed with a screw shaft 10. The screw shaft 10 forms part of the ball screw mechanism 7. Guide pins 13, 13 are mounted on one end (right-side end of FIG. 1) of the driving shaft 6. The pins 13, 13 contact the stopper ring 15 mounted on the second housing 2*b* to prevent the shaft from falling out of the housing. A guide member 16 is mounted in the blind bore 12 of the second housing 2*b*. The guide member 16 is formed with axially extending guide grooves 16*a*, 16*a*. The guide pins 13, 13 engage the guide grooves 16*a*, 16*a* so that the screw shaft 10 can axially move but is not rotated. Falling-out of the screw shaft 10 can be prevented by abutment of the pins 13, 13 against a stopper ring 15 mounted on the second housing 2*b*.

The guide member 16 is formed from sheet or pipe members of blister steel such as SCr 420 or SCM 415 etc. The guide member 16 is plastic worked and, more particularly, press worked pipe members. The surface of the guide member 16 is hardened by carburizing quenching to have a surface hardness of 50~64 HRC. This prevents wear of the guide member 16 for a long term. Thus, it improves its durability. The guide member 16 can be made of other materials than those described above, for example, of blister steel such as SCM 440, cold rolled steel sheet (JIS SPCC system) or carbon steel such as S45C. When using cold rolled steel or carbon steel, it is preferable that they are high frequency hardened to have a surface hardness of 50~64 HRC.

As shown in the enlarged view of FIG. 2, the ball screw mechanism 7 includes the screw shaft 10 and the nut 18 inserted on the screw shaft 10, via balls 17. The screw shaft 10 is formed on its outer circumference with a helical screw groove 10*a*. The screw shaft is supported axially movably but not rotationally in the housing. On the other hand, the nut 18 is formed on its inner circumference with screw groove 18*a* corresponding to the screw groove 10*a* of the screw shaft 10. A plurality of balls 17 are rollably contained between the screw grooves 10*a*, 18*a*. The nut 18 is rotationally supported by two supporting bearings 20, 20 but is axially immovably relative to the housings 2*a*, 2*b*. A numeral 19 denotes a bridge member that achieves an endless circulating passage of balls 17 through the screw groove 18*a* of the nut 18.

The cross-sectional configuration of each screw groove 10*a*, 18*a* may be either one of circular-arc or Gothic-arc configuration. However, the Gothic-arc configuration is adopted in this embodiment. It can have a large contacting angle with the ball 17 and set a small axial gap. This provides large rigidity against the axial load and thus suppresses the generation of vibration.

The nut 18 is formed of case hardened steel such as SCM 415 or SCM 420. Its surface is hardened to HRC 55~62 by vacuum carburizing hardening. This enables the omission of treatments such as buffing for scale removal after heat treatment. Thus, this reduces the manufacturing cost. On the other hand, the screw shaft 10 is formed of medium carbon steel such as S55C or case hardened steel such as SCM 415 or SCM 420. Its surface is hardened to HRC 55~62 by induction hardening or carburizing hardening.

The output gear 4, forming part of the speed reduction mechanism 6, is firmly secured on the outer circumference of the nut 18, via a key 14. The support bearings 20, 20 are press-fit onto the nut, via a predetermined interface, at both sides of the output gear 4. This prevents both the supporting bearings 20, 20 and output gear 4 from axially shifting even though strong thrust loads would be applied to them from the drive shaft 6. Each supporting bearing 20 includes a deep groove ball bearing with shield plates 20a, 20a mounted on both sides. The shield plates 20a, 20a prevent lubricating grease sealed within the bearing body from leaking outside and abrasive debris from entering into the bearing body from the outside.

In the illustrated embodiment, both the supporting bearings 20, 20 support the nut 18 in a rotatable manner. The support bearings 20, 20 are formed by deep groove ball bearing with the same specifications. Thus, it is possible to support both a thrust load applied from the drive shaft 6 and a radial load applied from the output gear 4. Also, it is possible to simplify confirmation of assembly error of the bearing and thus to improve the assembling operability. In this case, the term "same specifications" means that the deep groove ball bearings have the same inner diameters, outer diameters, rolling element sizes, rolling element numbers and internal clearances.

The abutment surfaces of the first and second housings 2a, 2b (only the second housing 2b is shown in FIG. 3) are formed with the inside surfaces of the housings substantially circular periphery. A plurality (four in the illustrated embodiment) of securing portions 21 are formed on each housing 2a, (2b) along its periphery. The securing portions 21 partially projected radially outward to receive fastening bolts 9 (FIG. 1). In addition, at least one of the first and second housings 2a and 2b is formed with ribs 23. The ribs 23 extend from each securing portions 21 to the cylindrical portion or containing portion forming the blind bore to contain the screw shaft 10. Another rib 23a extends along the periphery of each housing 2a and/or 2b.

As shown in FIG. 1, the height of each rib 23 arcuately varies from the securing portion 21 toward the cylindrical portion or containing portion 22 of the housing 2a and/or 2b. Thus, the tangential inclination of the arcuate rib 23 becomes gradually gentle toward the cylindrical portion or containing portion 22. This improves the strength and rigidity of the housing 2b while reducing its weight. The ribs 23 help to support the load applied to the cylindrical portion or containing portion 22 which is the weakest portion. This provides an electric linear actuator that can contribute to optimum design of the weakest portion of the cylindrical portion. Thus, this improves the durability of the electric linear actuator while increasing the strength against loads applied to the weakest portion. In addition, it is possible to prevent deformation of the abutting surfaces of the first and second housings 2a, 2b while increasing the strength and rigidity of the housings 2a, 2b by ribs 23, 23a. Thus, this improves the sealability of the housings 2a, 2b.

FIG. 4 shows a modification of the second housing 2b shown in FIG. 3. This housing 2b' is different from the housing 2b of FIG. 3 basically in structure of the ribs 23, 24. Therefore, the same reference numerals are used to designate the same parts. Thus, their detailed description will be omitted.

As shown in FIG. 4(a), the housing 2b' is formed with a substantially circular configuration. A plurality of securing portions 21 are formed on each housing 2b along its periphery. The securing portions 21 partially project radially outward. Ribs 24 are formed to extend from the securing portions 21 to the cylindrical portion or containing portion 22. Each rib 24 includes a pair of ribs 24a, 24b that are thinner than the rib 23 of FIG. 3. The height of each rib 24a, 24b arcuately varies from the securing portion 21 toward the cylindrical portion or containing portion 22 of the housing 2b'. Thus, the tangential inclination of the arcuate ribs 24a, 24b become gradually gentle toward the cylindrical portion or containing portion 22 as shown in FIG. 4(b). The thinned ribs 24a, 24b prevent the generation of air bubbles in a molded body during the die casting process. This reduces the weight of the housing without reducing the strength of the housing. Also, this achieves smooth circulation of mold lubricant during molding and thus improves the productivity.

Furthermore, the distance between ribs 24a, 24b varies so that it gradually increases toward the cylindrical portion or containing portion 22. This further improves the strength and rigidity of the housing 2b'.

The radially outermost end, tip end, of each rib 24 is set at a position radially outer than the bolt pitch circle diameter (B.C.D) of the fastening bolts 9 as shown in FIG. 5(a). This suppresses stress concentration that would be caused at a tip end 25 of the rib 24 by loads (shown by arrows) due to a bending moment M applied to the housing. Thus, this further improves the durability while increasing the strength and rigidity of the housing.

The electric linear actuator of the present disclosure can be used in general industry use, driving portions of an automobile etc. and applied to an actuator with a ball screw mechanism to convert a rotational input motion from an electric motor to a linear motion of a drive shaft.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. An electric linear actuator comprising:
   a housing, the housing is formed from die-cast aluminum alloy;
   an electric motor mounted on the housing;
   a speed reduction mechanism to reduce rotational speed of the electric motor, via a motor shaft;
   a ball screw mechanism to convert rotational motion of the electric motor, transmitted, via the speed reduction mechanism, to axial linear motion of a drive shaft, the ball screw mechanism comprising a nut and a screw shaft, the nut includes a helical screw groove on its inner circumference and the nut is supported by rolling bearings mounted on the housing, the nut is rotationally but axially immovably supported in the housing, the screw shaft is coaxially integrated with the drive shaft, the screw shaft includes a helical screw groove on its outer circumference corresponding to the helical screw groove of the nut, the screw shaft is inserted into the nut, via a large number of balls, the screw shaft is supported axially movably but not rotationally in the housing;

the housing comprises a first housing and a second housing, the electric motor is mounted on the first housing, the second housing abuts against an end face of the first housing; and at least one of the first and second housings is formed with ribs, the ribs extend from each securing portions to a containing portion for containing the screw shaft height of each rib arcuately varies from the securing portion toward the containing portion of the housing so that the tangential inclination of the arcuate rib becomes gradually gentle toward the containing portion, the securing portions are arranged on the periphery of the housing to receive fastening bolts.

2. The electric linear actuator of claim 1, wherein the radially outermost end of each rib is set at a position radially outer than the bolt pitch circle diameter of the fastening bolts.

3. The electric linear actuator of claim 1, wherein each rib is comprised of a plurality of thin walled ribs.

4. The electric linear actuator of claim 3, wherein each rib comprises a pair of ribs and a distance between the ribs varies so that it gradually increases toward the containing portion.

5. The electric linear actuator of claim 1, wherein the drive shaft is formed integrally with the screw shaft, a radially extending engaging pin is mounted on one end of the drive shaft, a guide member, having axially extending guide grooves, is mounted within a blind bore of the housing, and the engaging pin engages the guide grooves.

* * * * *